(12) United States Patent
Merlin et al.

(10) Patent No.: US 9,942,925 B2
(45) Date of Patent: Apr. 10, 2018

(54) STATION CONTENTION BEHAVIOR IN UPLINK MULTIPLE USER PROTOCOLS

(71) Applicant: QUALCOMM Incorporated, San Diego, CA (US)

(72) Inventors: Simone Merlin, San Diego, CA (US); Gang Ding, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 116 days.

(21) Appl. No.: 14/989,302

(22) Filed: Jan. 6, 2016

(65) Prior Publication Data

US 2016/0198500 A1  Jul. 7, 2016

Related U.S. Application Data

(60) Provisional application No. 62/100,859, filed on Jan. 7, 2015.

(51) Int. Cl.
| | |
|---|---|
| *H04W 76/02* | (2009.01) |
| *H04W 74/06* | (2009.01) |
| *H04W 74/08* | (2009.01) |
| *H04W 72/12* | (2009.01) |
| *H04W 84/12* | (2009.01) |

(52) U.S. Cl.
CPC ......... *H04W 76/021* (2013.01); *H04W 74/08* (2013.01); *H04W 74/0816* (2013.01); *H04W 72/121* (2013.01); *H04W 84/12* (2013.01)

(58) Field of Classification Search
CPC .. H04B 7/0452; H04W 72/121; H04W 74/08; H04W 74/0816; H04W 74/0833; H04W 76/021; H04W 84/12
See application file for complete search history.

(56) References Cited

U.S. PATENT DOCUMENTS

| | | | | |
|---|---|---|---|---|
| 8,879,490 B2* | 11/2014 | Lee | ....................... | H04L 1/0009 370/329 |
| 8,953,510 B2* | 2/2015 | Kang | ................... | H04B 7/0452 370/311 |

(Continued)

OTHER PUBLICATIONS

International Search Report and Written Opinion—PCT/US2016/012407—ISA/EPO—dated Mar. 30, 2015.

*Primary Examiner* — Ahmed Elallam
(74) *Attorney, Agent, or Firm* — Patterson & Sheridan, LLP

(57) ABSTRACT

Certain aspects of the present disclosure relate to station backoff behavior in uplink (UL) multiple user (MU) operations. Certain aspects of the present disclosure provide an apparatus for wireless communications. The apparatus generally includes a processing system configured to generate an unsolicited single user (SU) frame for transmission to an access point (AP) while the apparatus is configured to communicate with the AP via MU transmissions and a transmit interface configured to output the unsolicited SU frame for transmission. Certain aspects of the present disclosure provide another apparatus for wireless communications. The apparatus generally includes a processing system configured to contend for access to a medium by generating a first frame to trigger MU transmissions from a plurality of apparatuses and a transmit interface configured to output the first frame for transmission.

30 Claims, 7 Drawing Sheets

(56) References Cited

U.S. PATENT DOCUMENTS

| | | | |
|---|---|---|---|
| 2006/0121946 A1* | 6/2006 | Walton | H04B 7/0417 |
| | | | 455/561 |
| 2011/0150004 A1 | 6/2011 | Denteneer et al. | |
| 2011/0194593 A1* | 8/2011 | Geirhofer | H04W 72/048 |
| | | | 375/224 |
| 2011/0255618 A1 | 10/2011 | Zhu et al. | |
| 2012/0140615 A1 | 6/2012 | Gong | |
| 2012/0218982 A1* | 8/2012 | Lee | H04L 1/0009 |
| | | | 370/338 |
| 2012/0294255 A1* | 11/2012 | Seok | H04B 7/0452 |
| | | | 370/329 |
| 2012/0314694 A1* | 12/2012 | Hsieh | H04W 74/085 |
| | | | 370/338 |
| 2013/0051256 A1* | 2/2013 | Ong | H04W 74/0816 |
| | | | 370/252 |
| 2013/0208715 A1* | 8/2013 | Roh | H04L 1/0025 |
| | | | 370/338 |
| 2014/0105091 A1* | 4/2014 | Kang | H04B 7/0452 |
| | | | 370/311 |
| 2014/0301383 A1 | 10/2014 | Sohn et al. | |
| 2015/0103767 A1* | 4/2015 | Kim | H04W 74/06 |
| | | | 370/329 |
| 2015/0139205 A1* | 5/2015 | Kenney | H04W 52/241 |
| | | | 370/338 |

* cited by examiner

STATION CONTENTION BEHAVIOR IN UPLINK MULTIPLE USER PROTOCOLS

CLAIM OF PRIORITY UNDER 35 U.S.C. §119

The present Application for Patent claims benefit of U.S. Provisional Patent Application Ser. No. 62/100,859, filed Jan. 7, 2015, assigned to the assignee hereof and hereby expressly incorporated by reference herein.

BACKGROUND

Field of the Disclosure

Certain aspects of the present disclosure generally relate to wireless communications and, more particularly, to contention and backoff behavior of wireless devices in uplink (UL) multiple user (MU) protocols.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to contention and backoff behavior of access point (AP) and stations (STAs) in uplink (UL) multiple user (MU) protocols.

Certain aspects of the present disclosure provide an apparatus for wireless communications. The apparatus generally includes a processing system configured to generate a single user (SU) frame for transmission to an AP while the apparatus is configured to communicate with the AP via MU communication and a transmit interface configured to output the SU frame for transmission.

Certain aspects of the present disclosure provide an apparatus for wireless communications. The apparatus generally includes a processing system configured to contend for access to a medium by generating a first frame to trigger MU transmissions from a plurality of apparatuses and a transmit interface configured to output the first frame for transmission.

Certain aspects of the present disclosure provide a method for wireless communications. The method generally includes generating a SU frame for transmission to an AP while the apparatus is configured to communicate with the AP via MU communication and outputting the SU frame for transmission.

Certain aspects of the present disclosure provide a method for wireless communications. The method generally includes contending for access to a medium by generating a first frame to trigger MU transmissions from a plurality of apparatuses and outputting the first frame for transmission.

Certain aspects of the present disclosure provide an apparatus for wireless communications. The apparatus generally includes means for generating a SU frame for transmission to an AP while the apparatus is configured to communicate with the AP via MU communication and means for outputting the SU frame for transmission.

Certain aspects of the present disclosure provide an apparatus for wireless communications. The apparatus generally includes means for contending for access to a medium by generating a first frame to trigger MU transmissions from a plurality of apparatuses and means for outputting the first frame for transmission.

Certain aspects of the present disclosure provide a computer readable medium having instructions stored thereon for generating a SU frame for transmission to an AP while an apparatus is configured to communicate with the AP via MU communication and outputting the SU frame for transmission.

Certain aspects of the present disclosure provide a computer program product. The computer program product generally includes a computer readable medium having instructions stored thereon for contending for access to a medium by generating a first frame to trigger MU transmissions.

Certain aspects of the present disclosure provide a station. The station generally includes at least one antenna, a processing system configured to generate an SU frame for transmission to an AP while the station is configured to communicate with the AP via MU communication, and a transmitter configured to transmit the SU frame via the at least one antenna.

Certain aspects of the present disclosure provide an AP. The AP generally includes at least one antenna, a processing system configured to contend for access to a medium by generating a first frame to trigger MU transmissions from a plurality of apparatuses, and a transmitter configured to transmit the first frame via the at least one antenna.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
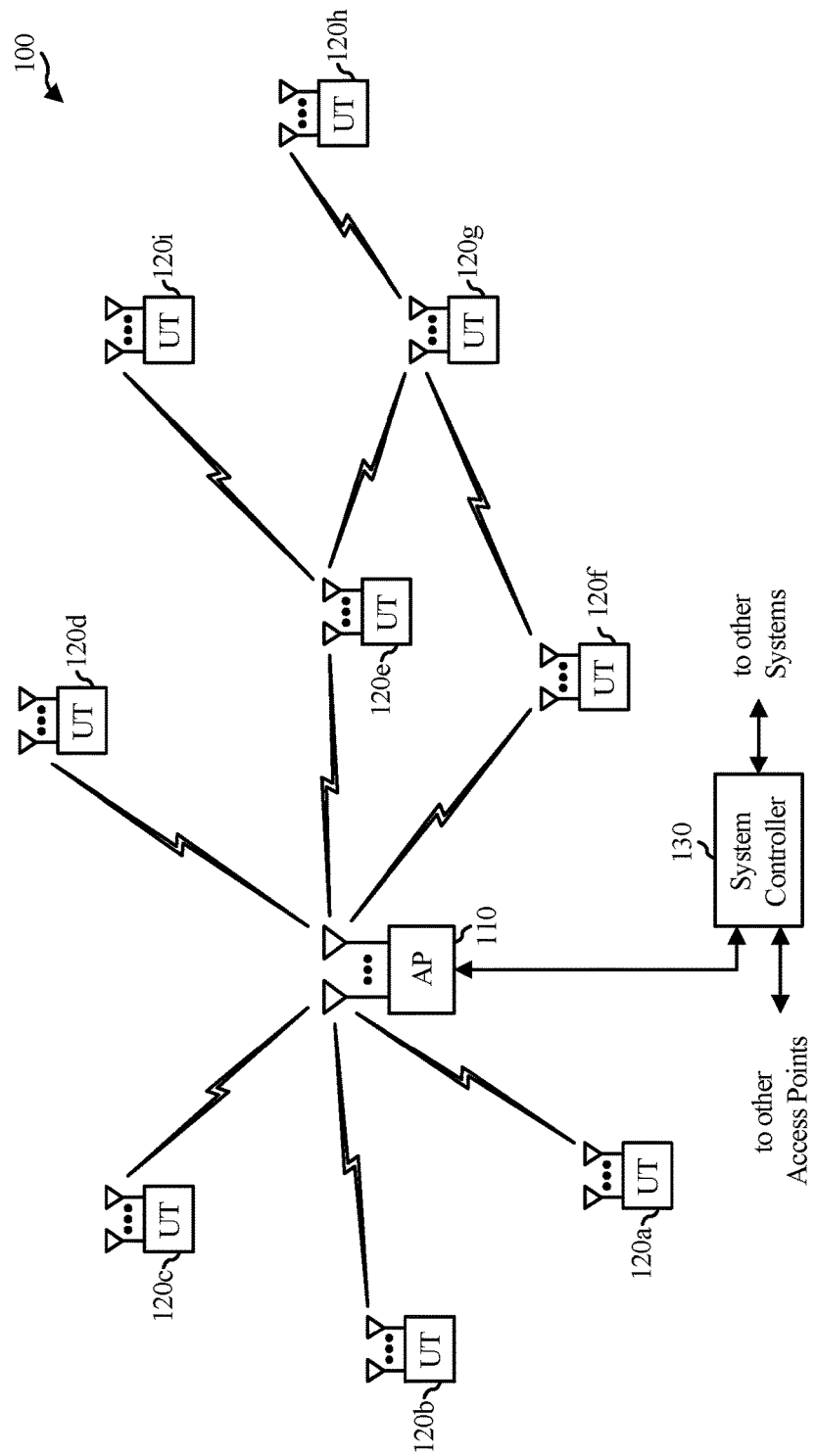
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to contention and backoff behavior of access point (AP) and stations (STAs) in uplink (UL) multiple user (MU) protocols. As will be described in more detail herein, a STA involved in MU operations may be allowed to send unsolicited single user (SU) transmissions. The AP may contend for access to the medium for sending MU trigger frames.

According to certain aspects, the AP may deprioritize SU transmissions in favor of MU transmissions, for example, by controlling Enhanced Distributed Channel Access (EDCA) parameters for SU and MU transmissions.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, user terminals (commonly referred to as stations or STAs) 120 may be configured to communicate with the access point 110 via multi-user (MU) transmissions. User terminals 120 may also be allowed to generate unsolicited single user (SU) frames for transmission to the access point 110. The access point 110 may also contend for access to the medium to send an MU trigger frame to the user terminals 120.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
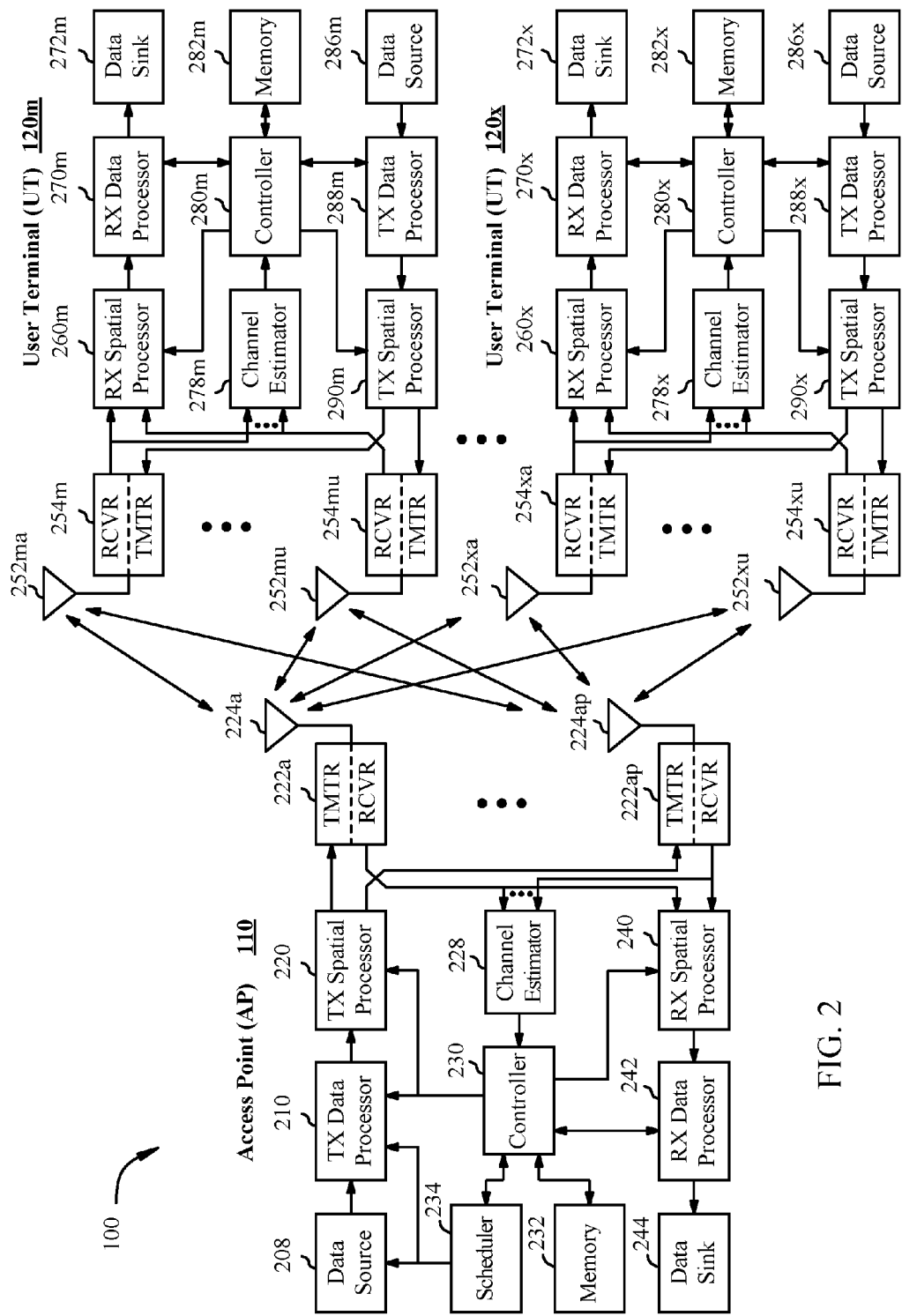
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 of access point 110 may be used to perform the operations described herein and illustrated with reference to FIGS. 7 and 7A. Similarly, antenna 252, Tx/Rx 254, processors 260, 270, 288, and 290, and/or controller 280 of user terminal 120 may be used to perform the operations described herein and illustrated with reference to FIGS. 5 and 5A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
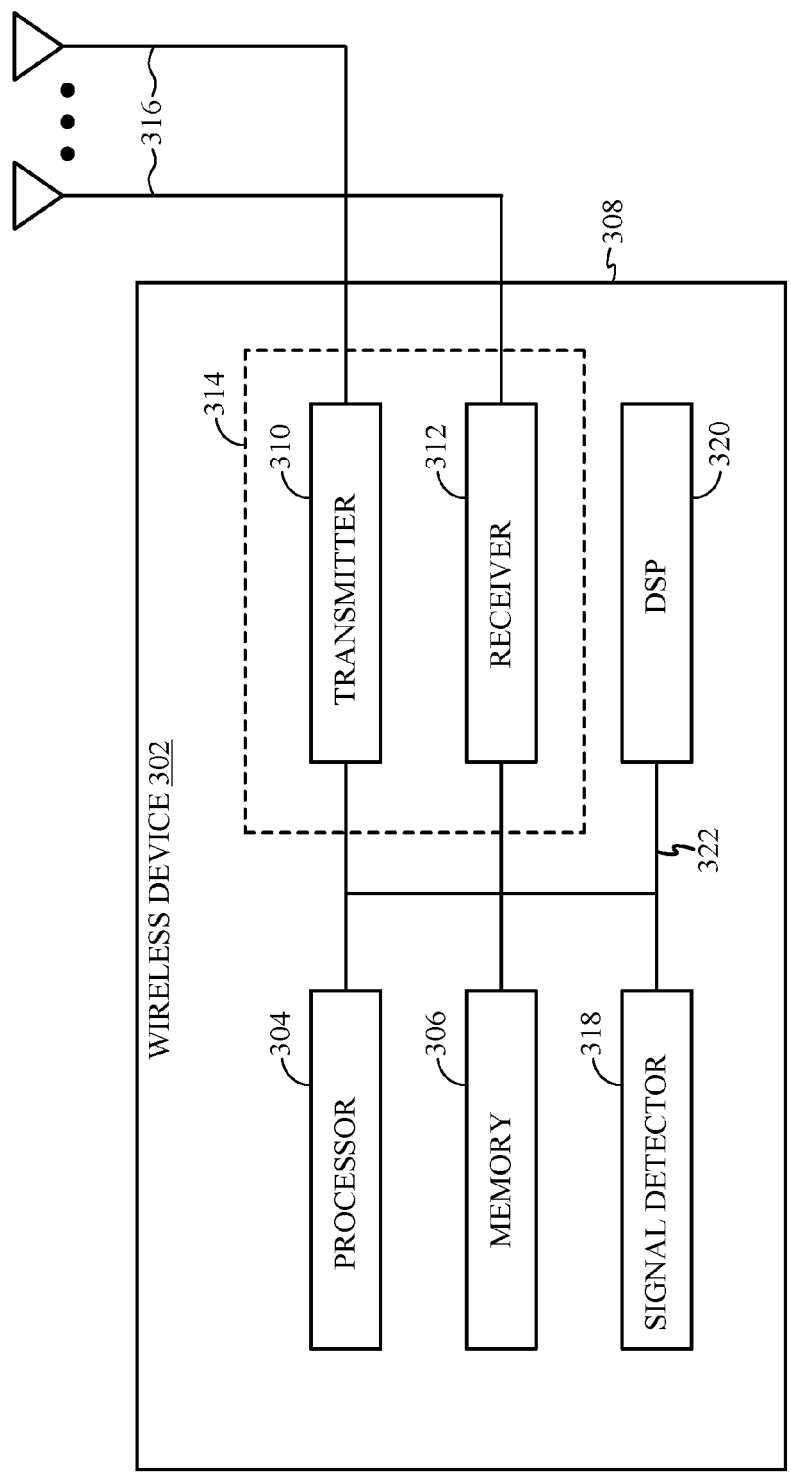
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 1000 and 1100 illustrated in FIGS. 10 and 11, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term multiple user (MU) transmission generally refers to a transmission from an access point to multiple users (whether sent as simultaneous or sequential packets within a transmit opportunity) or to a transmission to an access point from multiple users (whether sent as simultaneous or sequential packets within a transmit opportunity), while the term single user (SU) transmission generally refers to a transmission from an access point to a single user or to a transmission to an access point from a single user.

Example STA Contention Behavior in Uplink Multiple User Protocols

In multiple user (MU) communications, an uplink (UL) signal may be transmitted from multiple stations (STAs) to an access point (AP), or alternatively, a downlink (DL) signal may be transmitted from an AP to multiple STAs.

Typically, STAs send UL MU frames after receiving a trigger frame (TF) from an AP. The present disclosure addresses various issues for MU communications, such as when an AP sends trigger frames and when STAs operating in MU mode can access the medium, other than when responding to a received TF. Aspects of the present disclosure provide mechanism that may be used for contention-based medium access by STAs, even when operating in MU mode.

In other words, aspects of the present disclosure provide techniques for devices (e.g., APs and non-AP stations) to communicate using contention-based access for both MU and SU communications. Such techniques may allow, for example, a station to contend for access to send urgent data-without having to wait for a scheduled MU transmit opportunity (TXOP). In some cases, such techniques may allow a device to alter contention-based access, for example, to prioritize SU transmissions in the event MU operation is not performing adequately.

According to certain aspects, the UL signal or the DL signal may be transmitted using, for example, MU multiple-input multiple-output (MU-MIMO), MU (Orthogonal) frequency division multiple access (MU-(O)FDMA). Specifically, FIGS. 4-8 illustrate uplink MU-MIMO (UL-MU-MIMO) transmissions and that would apply equally to UL-(O)FDMA transmissions. In these embodiments, UL-MU-MIMO or UL-(O)FDMA transmissions can be sent simultaneously from multiple STAs to an AP and may create efficiencies in wireless communication.

Figure 4:
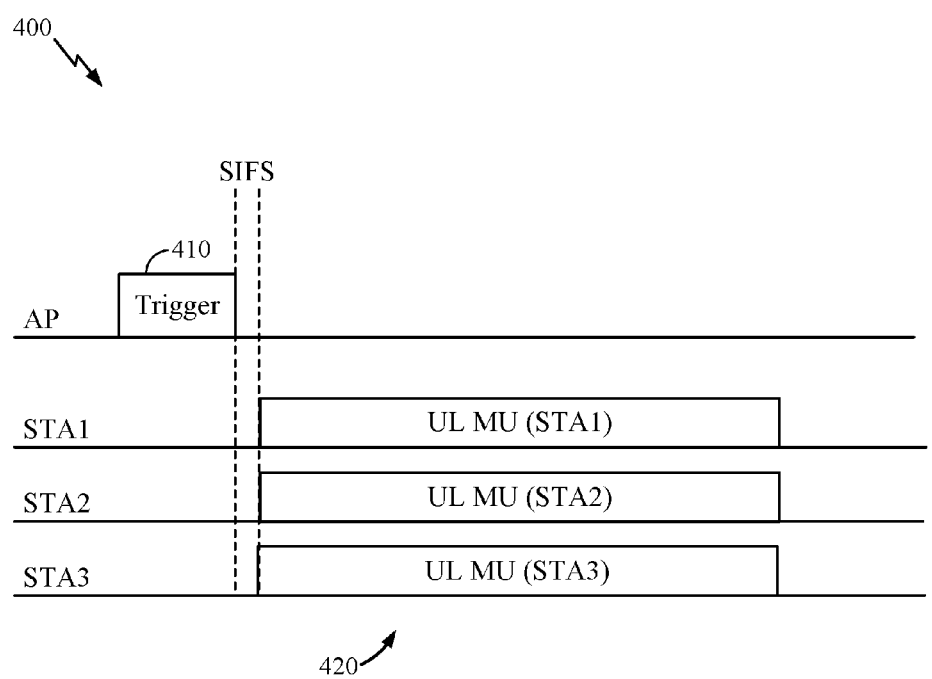
FIG. 4 illustrates an example uplink (UL) downlink (DL) frame exchange for multiple user (MU) communications, in accordance with certain aspects of the present disclosure.

FIG. 4 is an example UL/DL frame exchange 400 for MU communications, in accordance with certain aspects of the present disclosure. As shown in FIG. 4, the AP (e.g., AP 110) may transmit a trigger frame 410 (e.g., a clear-to-transmit (CTX) frame) to multiple STA1, STA2, and STA3 indicating which stations may participate in the MU communications, such that a particular STA knows to start an UL MU transmission.

According to certain aspects, the trigger frame may be transmitted in a payload portion of a physical layer convergence protocol (PLCP) protocol data units (PPDU). In response to the stations STA1, STA2, and STA3 receiving the trigger frame from the AP, where the STAs are indicated in the frame, the STAs may transmit an UL MU transmission (e.g., a ready-to-transmit (RTX) frame) to the AP. According to certain aspects, the STAs may send UL MU frames 420 a short interframe space (SIFS) time after receiving the trigger frame from the AP.

According to certain aspects, it may be desirable to define times or time periods when the AP sends trigger frames. Additionally, as noted above, it may be desirable to define when an STA participating in MU communications can access the medium, for example, other than when transmitting in response to a received trigger frame.

According to certain aspects of the present disclosure, techniques and apparatus are provided for STA contention and backoff behavior when performing in UL MU communications.

In general, STAs may be classified based on their capabilities. For example, STAs may be classified as SU-operating (e.g., STAs not capable of operating with UL MU or a UL MU capable STAs not requested to operate with UL MU) or MU-operating (e.g., if the STAs are UL MU capable and requested to operate with UL MU). In general, SU-operating STAs may be expected to only send SU PPDUs. On the other hand, MU-operating STAs may be requested by the AP to transmit UL MU PPDUs (instead of, or in addition to, SU PPDUs). A request to be included (participate) in UL MU operations may be indicated by the STA in a management fame sent to the AP or by indicating a request for a MU TXOP, or may be indicated implicitly by indicating UL MU as a capability of the STA.

Example MU-Operating STAs Contention for Access to Send SU-Transmissions

STAs participating in (or capable of participating in) MU operations may wish to send SU transmissions for relatively urgent matters. For example, MU-operating STAs may wish to send SU transmissions for time sensitive data or management information, sooner than waiting for the next trigger frame to send such data in an MU frame.

In some cases, MU-operating STAs may not be allowed to contend for access to the medium. In such cases, the MU-operating STAs may only transmit as a response to a TXOP granted by the AP with the transmission of a trigger frame or by scheduling transmission times.

In other cases, MU-operating STAs may be allowed to contend for access to the medium, to transmit an unsolicited SU frame. In some cases, the STAs may contend for access according to a first set of enhanced distributed channel access (EDCA) parameters.

Figure 5:
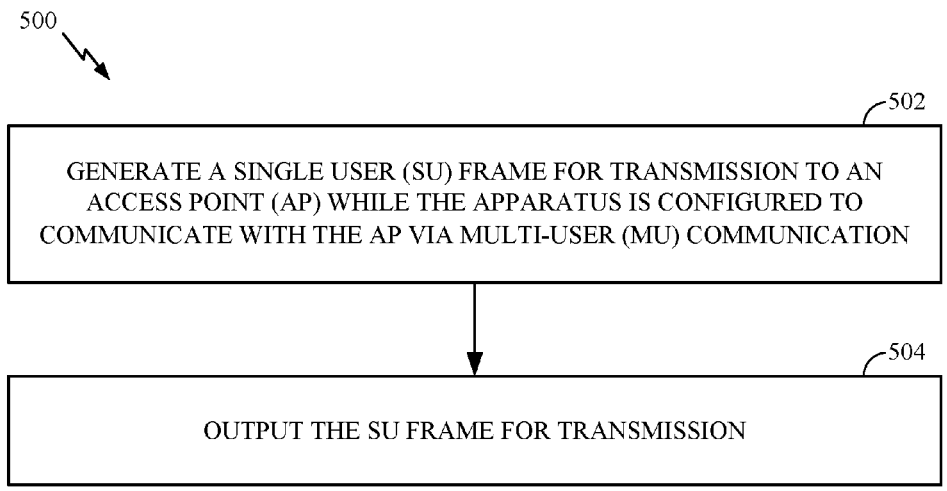
FIG. 5 is a flow diagram of example operations for wireless communications, in accordance with certain aspects of the present disclosure.
Figure 5A:
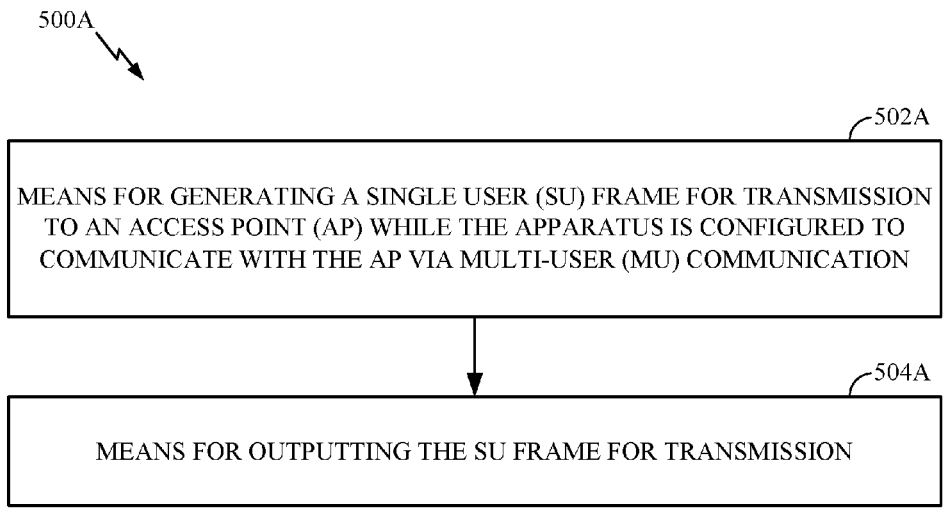
FIG. 5A illustrates example means capable of performing the operations shown in FIG. 5.

FIG. 5 illustrates example operations 500 for wireless communications, in accordance with certain aspects of the present disclosure. The operations 500 may be performed by an apparatus, for example, by a STA (e.g., such as user terminals/STAs 120).

The operations 500 begin, at 502, by generating a SU frame (e.g., an unsolicited SU frame) for transmission to an AP, while the apparatus is configured to communicate with the AP via MU communication. At 502, the STA may output the SU frame for transmission.

As noted above, STAs may be allowed to contend for access to the medium using enhanced distributed channel access (EDCA)-based protocols for sending unsolicited single user (SU) frames, for example, without being granted a transmission opportunity (TXOP) from the AP. According to certain aspects, even STAs participating in (e.g., having negotiated and advertised capability for) UL MU operations may be allowed to contend for access using EDCA.

In some cases, MU-operating and SU-operating STAs may use the same or similar EDCA parameters and may perform the same medium access procedures. In this operation mode, MU-operating STAs may acquire the medium to perform SU transmissions. This operation mode may be suited for latency sensitive traffic or for bursty traffic. However, the transmission of SU PPDUs may be less efficient than the transmission of MU PPDUs. Therefore, these unsolicited SU transmissions from MU-operating STAs may be discouraged (e.g., subject to different EDCA parameters) by the AP, for example, in order to favor MU transmissions over SU transmissions.

Deprioritization of the SU transmissions for MU-operating STAs may be useful in that it may limit the usage of the medium for SU transmissions, hence leaving more time for MU transmissions, thereby enhancing network efficiency.

In an example implementation, the AP may set "ad-hoc" EDCA Access parameters for these SU transmissions. For example, a first set of EDCA parameters used by the STA may be different than regular EDCA parameters used by the STA when the STA is not configured to communicate with the AP via MU transmissions. The AP may set different EDCA Access parameters for MU-operating STAs than for SU-operating STAs. As an example, the AP may set shorter TXOP limits, larger minimum contention window (CW), a larger maximum CW, or longer arbitration interframe space numbers (AIFSNs) for unsolicited SU frames.

According to certain aspects, MU-operating STAs may use a first value of the EDCA Access parameters during a first interval of time, and a second value of EDCA Access parameters during a second interval of time. For example, the first interval of time may be a time of duration T after the STA sent a request for an UL TXOP to the AP. The request may be sent using an RTX frame or indicated in an UL Data PPDU from the STA. Alternatively, the first interval of time may a time of duration T after the AP sends a CTX indicating the STA for UL transmission. The second interval of time may be the time after the expiration of the first interval.

In an example implementation, MU-operating STAs may not be allowed to access the medium during the first interval of time. In another example implementation, the first value of the EDCA parameters the STA may use during the first interval of time may be different than the second value of EDCA parameters the STA may use during the second time interval. The first value may include a shorter TXOP limit, a longer CWmin, a longer CWmax, and a longer AIFSN than the second value.

According to certain aspects, the parameters to be used for SU and MU operations may be indicated by the AP to each of the STAs. For example, the AP may send the indication in a management frame sent to each STA (e.g., a Probe or Association response) such as a management frame used in the setup of the MU operation mode. Alternatively, the indication may be sent to the STAs in a Beacon.

The value of the first and second set of EDCA value may be indicated by the AP to the STA by using a management frame. The time T may be negotiated between the AP and STA. For example, the STA may indicate a desirable T that may be compatible with the STA's traffic delay requirements. The AP may accept the request or may indicate an alternate value which may be accepted or denied by the STA.

In another example implementation, the AP may discourage unsolicited SU transmissions by allowing MU-operating STAs to contend for access to the medium with regular EDCA parameters, but the AP may only allow transmissions of certain packet types, for example, that request a TXOP.

According to certain aspects, an MU-operating STA that is allowed to contend and transmit SU PPDUs may be allowed to send an SU PPDU, including control, data, and/or management, according to the limitations of the EDCA access (e.g. TXOP limit). For example, an MU-operating STA that is allowed to contend and transmit SU PPDUs may be allowed to send only specific types of frames, such as only frames that request an UL TXOP (e.g. an RTX frame or a quality of service (QoS)-Null frame with a TXOP indication)

According to certain aspects, MU-operating STAs may inform the AP of a new burst of Data. In one example, the STAs may send a data frame, a short Data frame with a TXOP request, a frame with queue status feedback information, and/or by sending a control frame indicating the TXOP request. According to certain aspects, STAs may send a TXOP request frame with regular contention parameters (e.g., EDCA parameters) whether the STA is an SU-operating or MU-operating STA. According to certain aspects, the STA may piggyback the TXOP request/queue feedback in a Data frame rather sending an explicit request.

Figure 6:
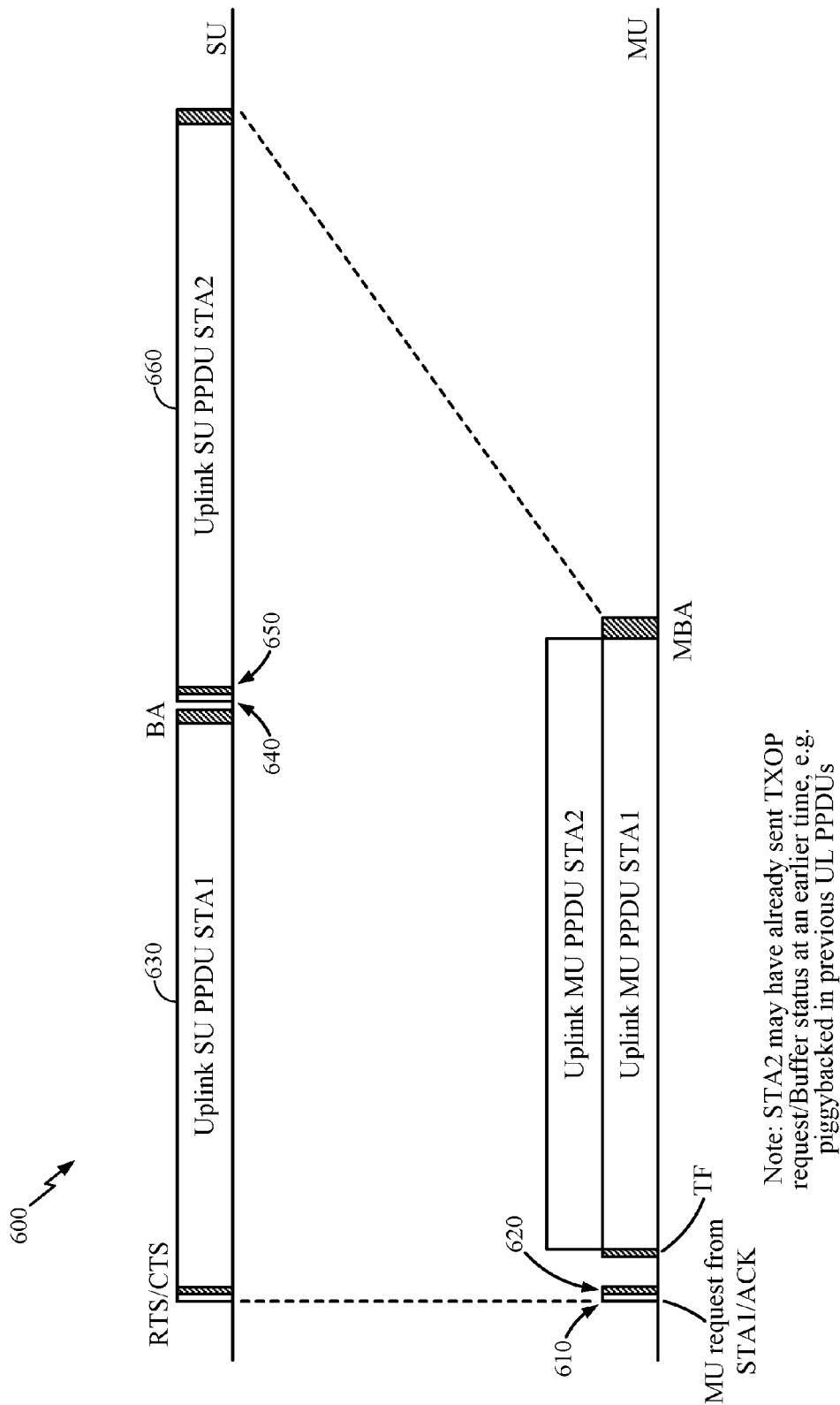
FIG. 6 is an example diagram illustrating an UL/DL frame exchange, in accordance with certain aspects of the present disclosure.

As shown in the example exchange 600 of FIG. 6, a first station (STA1) may send a request at 610 (e.g., for an SU TXOP or an MU TXOP). As shown, the AP may respond with an ACK 620 (acknowledgment of receipt of the request) and may immediately grant a TXOP for an SU transmission 630. Similarly, STA2 may send a request at 640 for an SU TXOP and the AP may respond with an ACK 650 granting a TXOP for an SU transmission 660. Allowing the SU TXOPs may allow the STAs to send data sooner than having to wait for a subsequent TF.

As an alternative, the AP may respond to a STA request with an immediate MU trigger frame-or with an ACK that indicates a time of a subsequent MU trigger frame. For example, STA2 may have already indicated it has buffered data, therefore, the AP may decide to wait until the MU trigger frame so STA1 and STA2 can send data-rather than grant an immediate SU TXOP to STA1.

In yet another example implementation, the AP may discourage unsolicited SU transmissions, for example, by allowing transmissions of only certain packet types and also by setting "ad-hoc" EDCA parameters for the transmissions.

In some cases, limited (or deprioritized) SU transmissions may be acceptable if the AP allocated MU data TXOPs to serve all of the MU-operating STAs. According to certain aspects, however, under certain "escape" conditions, the STAs may ignore the above limitations if MU operation is not well behaving.

In some cases, a STA may adjust the first set of EDCA parameters in response to detecting one or more conditions related to MU operation (e.g., with the adjustment of various parameters to achieve a desired result). For example, if the AP does not successfully send an MU trigger (e.g., if triggers collided, if an AP is an exposed node that is not able to access the medium to send the trigger, or if the AP is badly implemented) to an MU-operating STA within a reasonable time, the STA data delay may be impacted. According to certain aspects, such an MU-operating STA may revert to regular SU operation (and to the use of SU EDCA Access parameters) if the STA is not granted a TXOP by the AP after a certain time following the last TXOP request. In such cases, the STA may also ignore limitations on the types of frames that can be transmitted in SU. Such escape techniques may help the STAs to avoid starvation and/or delay when MU operations are not performing adequately. In another example, a STA may revert to SU operation if the obtained throughput or delay does not reach a pre-negotiated level with the AP.

Example STA Backoff After Receiving a Trigger

According to certain aspects, an MU-operating STA that is allowed to contend for access to the medium may receive a trigger (e.g., a CTX) from the AP granting an UL MU TXOP while the STA is performing the backoff procedure for transmitting an SU PPDU. In such cases, the STAs ongoing backoff countdown may be affected by the reception of the CTX that grants the UL TXOP.

According to certain aspects, a STA may be polled or receive a trigger from an AP with a traffic identifier (TID). For example, an MU-operating STA which has an ongoing backoff procedure may receive a CTX from the AP which grants a TXOP.

According to certain aspects, the trigger may indicate one or more backoff parameters for contention based access to the medium. The STA may start a backoff countdown timer. In an example implementation, the AP may indicate a deterministic backoff.

Since the AP knows which STAs are being polled and will be contending for access to the medium, a deterministic backoff indication enforced by the AP in the polling/triggering frame may be used to reduce contention. According to certain aspects, the AP may indicate the backoff counter per STA, or the backoff counter may be derived implicitly from the trigger information, or the backoff counter may be backoff counter may be linked to the STA association identifier (AID).

According to certain aspects, a STA may stop the current backoff procedure and restart a new backoff procedure initializing the backoff countdown counter to a value which is a function of the STA ID. The value may be communicated to the STA in the CTX itself, or in the ACK/BA in response to the UL MU PPDU, or may be a function of the STA AID, or may have been communicated to the STA at association or at MU-operation setup via a management frame.

In priority-based contention, the AP may pre-determine a few sets of contention parameters with different levels of priority. In such cases, the AP may specify the contention parameter set for each polled STA based on its priority, which may be determined according to certain polling criteria. In a contention-free approach, the AP may specify a unique time slot for each polled STA.

In another example implementation, the STA may resume the backoff it was doing prior to receiving trigger, regardless of the outcome of the transmission. For example, the STA may maintain the backoff countdown timer regardless of obtaining a trigger frame or success of an MU transmission triggered by the trigger frame. In other words, the polled transmission may not have any impact on the non-polled transmission.

In yet another example implementation, an MU-operating STA which has an ongoing backoff procedure, upon reception of a trigger from the AP which grants a TXOP, may stop the current backoff procedure and start a new one after the transmission of the UL MU PPDU in the granted TXOP and depending on the outcome of that transmission.

According to certain aspects, the STA may adjust the backoff countdown based, at least in part, on success of failure of an MU transmission triggered by the trigger frame. In one example the backoff procedure may be restarted as if the UL MU PPDU transmission was the result of the completion of the previously ongoing backoff procedure, according to EDCA rules.

For example, if the UL MU PPDU transmission is successful, the STA will reset the contention window value corresponding to the TID of the transmitted PPDU or the granted TXOP, and the STA will restart another backoff countdown according to the contention window and other EDCA parameters. Alternatively, if the UL MU PPDU transmission is not successful, the STA will increase the contention window value for the TID of the transmitted PPDU and restart another backoff countdown according to the contention window and other EDCA parameters.

In yet another example implementation, the STA may restart backoff after responding to the trigger. In other words, the polled transmission may be treated as if it were a non-polled transmission. If transmission was successful, CWmin may be reset for the transmitted TID. If the transmission was in error, the contention window may be doubled for the transmitted TID.

In yet another example implementation, backoff may be disincentive. If transmission was successful, the contention window may be increased (e.g. doubled) for the transmitted TID, which may provide a longer backoff time for SU transmissions, hence, favoring MU transmissions. If transmission was in error, the contention window may be double for the transmitted TID, previous backoff may be resumed, or the STA may stop accessing the channel for a certain time.

In some implementations, the STA may be forbidden from accessing the medium for a certain period of time after receiving the trigger.

According to certain aspects, the AP may indicate different EDCA parameters to be used for initializing the backoff after receiving the UL MU TXOP. In one example, the STA may use a first set of EDCA parameters for sending SU PPDUs, until the size of its data buffer is lower than a certain threshold, or the delay below a certain threshold. If the size of the data buffer or the delay exceed a threshold, the STA may use higher priority EDCA parameters for transmitting the SU PPDU. The higher priority access may be achieved by resetting the contention window, decreasing the CWmin, decreasing the CWmax, decreasing the AIFSN, or increasing the TXOP limit.

According to certain aspects, while sending an RTX to request an MU TXOP, the STA may use regular EDCA Access parameters indicated by the AP. Alternatively, the STA may adjust EDCA backoff as a function of the pending data size. For example, a STA with more data in the buffer should have a higher chance of accessing the channel. Once an STA has data in the buffer, the STA may start EDCA. During contention, if the buffer size exceeds a certain level of X bytes, the STA may choose to expedite the contention by resetting the contention window size, decreasing the contention window size, or maintaining the current contention window size even after timeout. If the STA has been in expedited contention mode for a certain time without getting channel access or reducing buffered data, the STA may re-start EDCA. In another alternative, the STA may adjust the backoff as a function of the frequency of received triggers. For example, a longer contention window may be used for more received triggers. In yet another alternative, the STA may adjust the backoff a function of the length of the frame to be transmitted.

According to certain aspects, the EDCA parameters to be used by the STA for contention may be a function of the frequency and duration of the granted UL MU TXOP. STAs may indicate to the AP the required traffic requirements in terms of latency and throughput. STAs receiving seldom MU TXOP or MU TXOPs that may not be sufficient to satisfy the STAs traffic requirements, may set their EDCA parameters to obtain a higher priority access. For example, STAs receiving the required delay or throughput, may use less aggressive EDCA parameters. The function relating EDCA parameters and received service may be indicated in the wireless standards or defined by the AP.

Example AP Contention and Backoff

Figure 7:
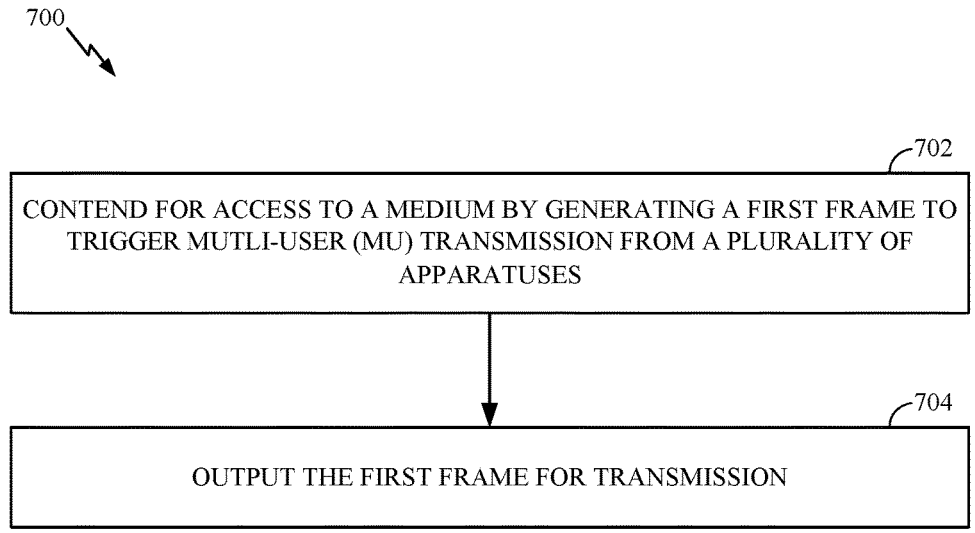
FIG. 7 is a flow diagram of example operations for wireless communications, in accordance with certain aspects of the present disclosure.
Figure 7A:
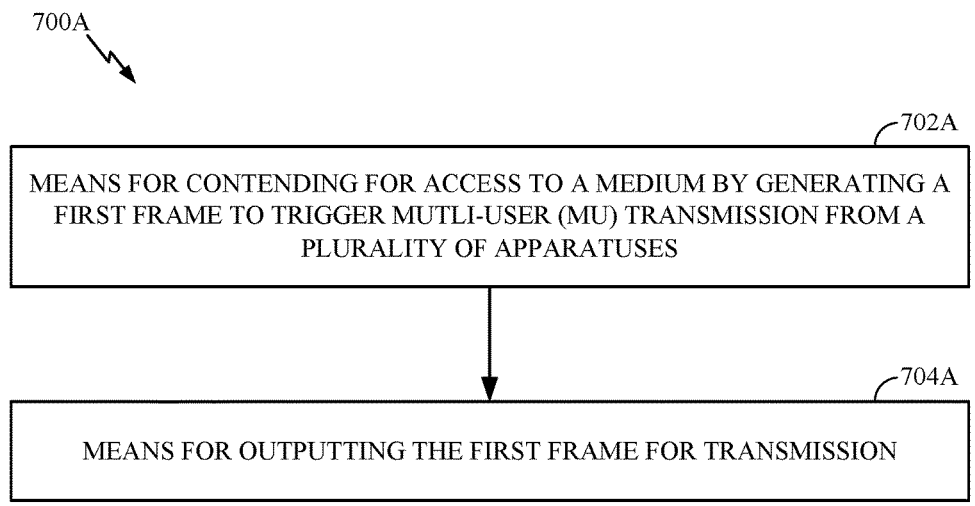
FIG. 7A illustrates example means capable of performing the operations shown in FIG. 7.

According to certain aspects, the AP may also use EDCA to send trigger (e.g., CTX) frame (for which the AP may use higher priority). FIG. 7 illustrates operations 700 for wireless communications, in accordance with certain aspects of the present disclosure. The operations 700 may be performed, for example, by a station (e.g., access point 110). The operations 700 may begin, at 702, by contending for access to a medium by generating a first frame to trigger MU transmissions from a plurality of apparatuses. At 702, the AP may output the first frame for transmission.

According to certain aspects, the AP may contend for access to send the trigger frame after more than one STA indicates the presence of buffered data to send. For example, the STA may indicate the buffered data in an SU frame which may be data frame, data frame with a TXOP request, a frame with queue status information, or a control frame indicating a TXOP request. Alternatively, the AP may contend for access to transmit the trigger frame at regular intervals (e.g., periodically).

Since the AP is typically in control of the EDCA parameters for itself and for all STAs in the basic service set (BSS), the AP can optimized the EDCA parameters such that the AP has sufficiently higher priority in accessing the medium for sending the trigger frame. The EDCA parameters for the AP contention may be a function of the received requests from STAs. For example, the contention may be prioritized if more requests, or more urgent requests, are received from the STAs. Alternatively, the contention may be deprioritized if fewer requests are received from the STAs.

In one example, the AP may access the medium once the medium has been idle for a PIFS duration (or some other similar short interframe space). Since other BSS STAs may be configured to wait for longer time, the AP has strict priority in accessing the medium as soon as it becomes idle. This may allow for the AP to access the medium immediately after a client STA releases the medium.

If more than one neighboring AP uses the same waiting time for accessing the medium, the APs transmissions may collide as soon as the medium becomes idle. In another example, the collision may be avoided if the AP uses a short interframe time (e.g., a PIFS) for medium access only if the medium if the medium was held busy by one of its BSS STAs. If the medium was held busy by an OBSS AP/STA, the AP may not use a short interframe space for access, and may instead perform a random backoff to avoid the OBSS collision. The AP may identify whether the medium was held busy by a device in its BSS or OBSS by detecting the preamble or the MAC header, which may have addressing information, of the frame that was occupying the medium or that reserved the NAV. the preamble/mac header In one example, the AP may generate one or more frames to indicate, to the other apparatuses, a first set of EDCA parameters to use for accessing the medium for sending at least one unsolicited SU frame (e.g., based on an amount of data buffered at the apparatus). According to certain aspects, the AP may also generate one or more frames to indicate, to the other apparatuses, a second set of EDCA parameters to use for accessing to the medium when the apparatuses are not configured to communicate with the apparatus via MU transmissions. According to certain aspects, the first set of EDCA parameters may have a shorter TXOP limit than the second set of EDCA parameters, a larger minimum or maximum contention window than the second set of EDCA parameters, or a larger AIFSN than the second set of EDCA parameters.

According to certain aspects, in response to receiving an unsolicited SU frame, the AP may send an SU TXOP grant, an MU TXOP grant, or an ACK frame. The ACK frame may indicate a timing of transmission of the first frame (e.g., trigger frame). A trigger frame may also include one or more backoff parameters for contention based access to the medium by a detecting STA.

According to certain aspects, when sending a delayed trigger frame (e.g., in a hybrid mode), the AP use adjusted EDCA for backoff. For example, the AP may start a backoff countdown timer after receiving a response frame (e.g., RTX frame) and sending an ACK. The AP may delay transmission of the trigger frame based on the backoff countdown timer.

During contention, the AP may expedite contention when an STA repeatedly sends RTX frames with larger buffered data, when a new RTX frame from other STAs are received, and/or when an STAs efficiency exceeds the cutoff. Alternatively, the STA may communicate its residual backoff to the AP and the AP may use the residual backoff to contend for access (e.g., determine when to transmit the trigger frame) or to select which STAs to include (e.g., which STAs to target with the trigger frame).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 and operations 700 illustrated in FIG. 7 correspond to means 500A illustrated in FIG. 5A and means 700A illustrated in FIG. 7A, respectively.

For example, means for obtaining and means for receiving may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for outputting and means for transmitting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for processing, means for determining, means for generating, means for including, means for contending, means for adjusting, means for starting, means for refraining (to refrain from contending for access), and means for increasing may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for generating an unsolicited SU frame for transmission to an AP while the apparatus is configured to communicate with the AP via MU transmissions, and an algorithm for outputting the unsolicited SU frame for transmission. In another example, an algorithm for contending for access to a medium by generating a first frame to trigger MU transmissions from a plurality of apparatuses and an algorithm for outputting the first frame for transmission.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for generating an unsolicited SU frame for transmission to an AP while the apparatus is configured to communicate with the AP via MU transmissions, and instructions for outputting the unsolicited SU frame for transmission. In another example, instructions for contending for access to a medium by generating a first frame to trigger MU transmissions from a plurality of apparatuses and instructions for outputting the first frame for transmission.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
generate a single user (SU) frame for transmission to an access point (AP) while the apparatus is configured to communicate with the AP via multi-user (MU) communication; and
contend for access to a medium, for transmission of the SU frame, by performing a medium access procedure according to a first set of enhanced distributed channel access (EDCA) parameters while the apparatus is configured to communicate with the AP via MU communication; and
a first interface configured to output the SU frame for transmission if the medium is acquired.

2. The apparatus of claim 1, wherein the first set of EDCA parameters is different than a second set of EDCA parameters used to contend for access to the medium when the apparatus is not configured to communicate with the AP via MU communication.

3. The apparatus of claim 2, further comprising a second interface configured to obtain the first set of EDCA parameters and the second set of EDCA parameters from the AP.

4. The apparatus of claim 1, wherein:
the processing system is further configured to adjust the first set of EDCA parameters in response to detecting one or more conditions related to MU communication.

5. The apparatus of claim 4, wherein:
the processing system is configured to adjust the first set of EDCA parameters by setting the first set of EDCA parameters to be the same as a second set of EDCA parameters used to contend for access to the medium when the apparatus is not configured to communicate with the AP via MU communication.

6. The apparatus of claim 1, wherein:
the SU frame comprises: a data frame, a data frame with a transmission opportunity (TXOP) request, a frame with queue status information, or a control frame indicating a TXOP request.

7. The apparatus of claim 1, further comprising a second interface configured to obtain, after the SU frame is output for transmission, a SU transmission opportunity (TXOP) grant, a MU TXOP grant, or an acknowledgment (ACK) frame.

8. The apparatus of claim 7, wherein the ACK frame comprises an indication of timing of transmission of a frame sent from the AP to trigger MU transmissions from at least one of the apparatus or one or more other apparatuses.

9. The apparatus of claim 1, further comprising a second interface configured to obtain, from the AP, a trigger frame configured to trigger MU transmissions from at least one of the apparatus or one or more other apparatuses.

10. The apparatus of claim 9, wherein:
the trigger frame indicates one or more backoff parameters for contention based access to the medium; and
the processing system is configured to start a backoff countdown timer based on the one or more backoff parameters.

11. The apparatus of claim 9, wherein the processing system is configured to start a backoff countdown timer and maintain the backoff countdown timer regardless of obtaining the trigger frame or success of an MU transmission triggered by the trigger frame.

12. The apparatus of claim 9, wherein the processing system is configured to adjust a backoff countdown based, at least in part, on success or failure of an MU transmission triggered by the trigger frame.

13. The apparatus of claim 9, wherein the processing system is configured to increase a contention window for accessing the medium for SU transmissions if an MU transmission triggered by the trigger frame is successful.

14. The apparatus of claim 1, wherein:
the processing system is configured to adjust one or more backoff parameters during the contention for access to the medium for transmission of the SU frame, said adjustment being based on an amount of data buffered at the apparatus.

15. The apparatus of claim 14, wherein the processing system is configured to adjust a contention window size if the amount of data buffered at the apparatus is equal to or exceeds a threshold value.

16. The apparatus of claim 1, further comprising a second interface configured to obtain, from the AP, one or more trigger frames configured to trigger MU transmissions from at least one of the apparatus or one or more other apparatuses; wherein
the processing system is configured to adjust one or more backoff parameters during the contention for access to the medium for transmission of the SU frame, said adjustment being based on a frequency of the one or more trigger frames obtained from the AP.

17. The apparatus of claim 1, wherein:
the processing system is configured to adjust one or more backoff parameters during the contention for access to the medium for transmission of the SU frame, said adjustment being based on a length of the SU frame.

18. The apparatus of claim 1, further comprising a transmitter via which the SU frame is transmitted, wherein the apparatus is configured as a wireless station.

19. An apparatus for wireless communications, comprising:
a processing system configured to:
generate a first frame to trigger multi-user (MU) transmissions from a plurality of apparatuses; and
generate one or more other frames to indicate to one or more of the apparatuses a first set of enhanced distributed channel access (EDCA) parameters to use for accessing a medium for sending at least one single user (SU) frame; and
a first interface configured to:
output the first frame for transmission; and
output the one or more other frames for transmission.

20. The apparatus of claim 19, wherein the first interface is configured to periodically output the first frame for transmission.

21. The apparatus of claim 19, further comprising:
a second interface configured to obtain one or more frames having an indication that one or more of the apparatuses have buffered data, wherein the processing system is configured to generate the first frame in response to the indication.

22. The apparatus of claim 21, wherein the one or more obtained frames comprise SU frames.

23. The apparatus of claim 22, wherein:
the SU frames comprise at least one of a data frame, a data frame with a transmission opportunity (TXOP) request, a frame with queue status information, or a control frame indicating a TXOP request.

24. The apparatus of claim 19, further comprising a second interface configured to obtain at least one SU frame from one or more of the apparatuses after the first frame and the one or more other frames are output for transmission.

25. The apparatus of claim 19, further comprising a second interface configured to obtain at least one SU frame from one or more of the apparatuses, wherein the processing system is further configured to generate, in response to the obtained at least one SU frame, an SU transmit opportunity (TXOP) grant, an MU TXOP grant, or an acknowledgment (ACK) frame.

26. The apparatus of claim 19, wherein the first frame comprises one or more backoff parameters for use by one or more of the apparatuses to contend for access to the medium.

27. The apparatus of claim 19, further comprising:
a second interface configured to obtain a frame from one or more of the apparatuses, wherein the processing system is configured to start a backoff countdown timer based on receipt of the obtained frame and delay transmission of the first frame based on the backoff countdown timer.

28. The apparatus of claim 19, further comprising:
a second interface configured to obtain a frame from one or more of the apparatuses indicating a residual backoff time associated with the one or more of the apparatuses, wherein the processing system is configured to determine which of the one or more of the apparatuses to target with the first frame based on the residual backoff time.

29. The apparatus of claim 19, further comprising a transmitter via which the first frame and the one or more other frames are transmitted, wherein the apparatus is configured as an access point.

30. A method for wireless communications by an apparatus, comprising:
generating a single user (SU) frame for transmission to an access point (AP) while the apparatus is configured to communicate with the AP via multi-user (MU) communication;
contending for access to a medium, for transmission of the SU frame, by performing a medium access procedure according to a first set of enhanced distributed channel access (EDCA) parameters while the apparatus is configured to communicate with the AP via MU communication; and
outputting the SU frame for transmission if the medium is acquired.

* * * * *